Jan. 7, 1930.  L. LEONARD  1,742,513
ROLLER BEARING
Filed March 10, 1927
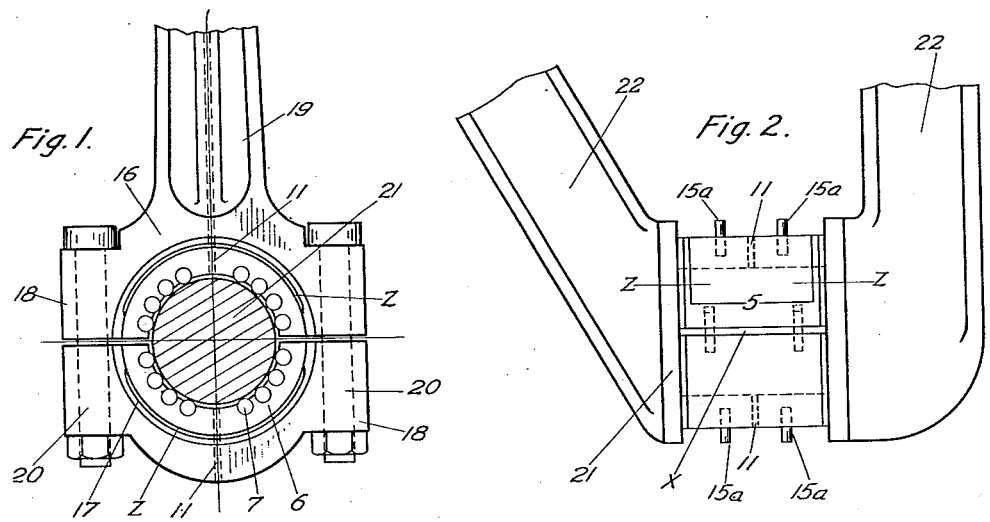
Fig. 1.
Fig. 2.
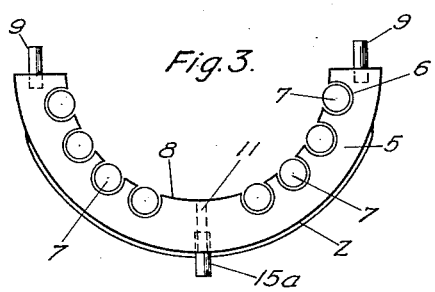
Fig. 3.
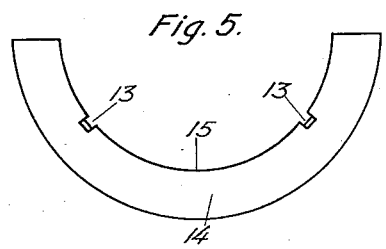
Fig. 5.
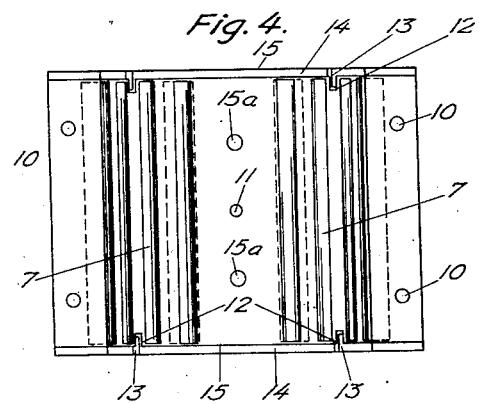
Fig. 4.
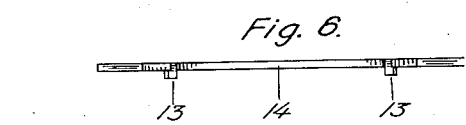
Fig. 6.
Inventor
Lawrence Leonard
By
Attorney Patented Jan. 7, 1930

1,742,513

UNITED STATES PATENT OFFICE

LAURENCE LEONARD, OF LOS ANGELES, CALIFORNIA

ROLLER BEARING

Application filed March 10, 1927. Serial No. 174,331.

This invention relates to roller bearings, constructed of steel of the necessary thickness and hardened or tempered to the degree necessary, and particularly, to split roller bearings adapted for general application to shafts, axles and journals generally.

The main object of the invention is to provide a bearing of the class specified, comprising structurally simplified components of advantageous wearing durability, and of a sectional or two-part organization throughout the structure of the essential elements to permit facility and accuracy of application without liability of displacement or irregular disposition, either during the practical service of the bearing, or at the time the several components are applied in operative positions relatively to a shaft or journal; advantageous free oiling, either by splash or pressure.

A further object of the invention is to generally improve roller bearings and render them more efficient to minimize wear, and to materially reduce the cost of manufacture and installment of devices of this class, and also to adapt the several parts for compact arrangement during transportation.

With these and other objects in view, the invention consists in the construction and arrangement of the several parts which will be more fully hereinafter described and claimed.

In the drawing:

Figure 1 is an end elevation showing the improved bearing applied to a shaft illustrated in cross-section and the adjacent roller locking ring removed.

Figure 2 is a side elevation of the bearing applied and a portion thereof removed.

Figure 3 is an end elevation of one half of the bearing sleeve on a larger scale.

Figure 4 is a top plan view of one half of the bearing sleeve and halves of the roller locking rings applied thereto.

Figures 5 and 6 are, respectively, a side elevation, and a top plan view of one half of one of the roller locking rings.

In the drawing, the improved bearing is shown applied to a connecting rod as one illustration of a practical application of the bearing, but it will be understood that the bearing is not to be understood as confined to this particular application, as it is capable of use with any type of bearing carrying component or with any shaft or journal to which it is applicable to perform its function.

The improved bearing comprises two semi-circular sleeves 5, having longitudinal grooves or channels 6 extending parallel from end to end of said sleeves to receive rollers 7 which have free movement or rotation in said grooves or channels, and slightly project into the semi-circular recesses 8 formed in the sleeves, and which, conjointly form the shaft opening through the associated sleeves. One sleeve has matching pins 9 projecting from opposite edges to fit sockets 10 in the opposite edges of the companion sleeve. Each sleeve has the rollers 7 arranged therein in groups preferably on opposite sides of a line representing the dead center, and between these groups of rollers an oil hole 11 is formed through the vertical center of each sleeve. Each sleeve also has key-seats or recesses 12 at the ends. The matching pins 9 are for accurately assembling the sleeves 5, and the key-seats 12 are provided for receiving angularly bent keys 13 of roller locking rings 14 also of semi-circular contour and applied to the opposite ends of the sleeve 5, the rollers 7 rotatably abutting at their ends against the inner surface of these locking rings. The keys 13 are cut from and integrally formed with the inner semi-circular edges 15 of the rings 14. and the said keys 13 and seats 12 therefor are of such inward extent into the sleeves 5 as to positively and reliably hold the locking ring sections or members in association with the opposite ends of the said sleeves. The key-seats 12 are formed between the rollers 7, or each seat is located between two of the latter rollers. The locking rings may or may not be used, according to the system of oiling or lubrication used.

The bearing sleeves 5 also have outwardly projecting bearing retaining pins 15$^a$, which are adapted to enter suitable openings in an encircling bearing casing or shell 16 of suitable thickness and also comprising semi-circular sections. The bearing, as thus formed, is inserted in a circular opening 17, formed in the heads 18 of a connecting rod 19, said heads being formed as usual in devices of this character, and, as illustrated, are connected by suitable nutted screw pins or bolts 20, and whereby the parts of the bearing are firmly held within the heads 18 to receive therethrough and cooperate with a shaft 21. As heretofore indicated, this is but one possible application of the improved bearing, and the bearing will be similarly associated with a crankshaft 22, as shown by Figure 2, with the same practical service and advantageous results.

The rollers 7, as heretofore indicated, have a very small portion thereof projecting from the longitudinal grooves or channels 6 therefor, and they have essentially but a line contact with the shaft or journal with which they engage. By the application of the roller locking rings at opposite ends of the bearing sleeves, the roller 7 are prevented from having endwise movement in the said sleeves, and also said rings prevent any part or parts of the rollers from moving out of place in the event of breakage, or the said rollers or fractured parts thereof cannot, to any extent, become disengaged from the grooves or channels 6. The rollers 7 assist in carrying the turning load of the shaft or journal in the easiest possible manner without the least friction, and the groups of the said rollers on opposite sides of dead center may vary in number in each group, and also to so place the rollers at regularly spaced intervals or irregular intervals or in groups so that there may be a greater number on one side of the dead center than the other. By arranging the rollers in offset positions or in groups relatively to dead center, the blow and thrust of a piston resulting from a firing stroke of a hydrocarbon internal combustion engine, when the bearing is applied to a connecting rod, for instance, is not imposed on a single roller, but evenly distributed on a number of rollers, and hence it is impossible to pound out or flatten the rollers. In the event that the bearing becomes worn or loose, that is, the bearing sleeve roller grooves or channels become enlarged or the rollers wear down, the looseness or play may be taken up by inserting oversized rollers. Another mode of compensating for wear, or to provide a takeup of the bearing, is to turn the bearing completely around on the shaft in the first instance, or reversely, to the original direction of rotation, or by the use of shims. Furthermore, the rollers have shifting movement enough in their grooves or channels from one side towards the other side of each groove or channel as to accommodate the application of the bearing to connecting rods or analogous devices of a V-type of motor, wherein the connecting rods are disposed at an angle. The improved bearing is rendered alignable and true by reason of the outer retaining pins engaging an enclosing element of a specific nature heretofore described, or, which may fit into sockets or holes in the connecting rod collar, and the bearing is thus always maintained in true alignment against tendency to displacement by the blow and thrust of the piston resulting from the firing stroke. Another advantage, particularly when the bearing is used with a crankshaft, is the efficiency in lubrication, there being sufficient distance between the inside edge of the bearing sleeves as a whole, and the crankshaft, to permit a large amount of oil to enter the bearing, and surround each roller and the crankshaft. With a high pressure force feed, this bearing can be nearly floated. The improved bearing, when applied to a crank shaft or over the journal of the latter, or, to a shaft that may be collared, is further very efficient and advantageous in the expediency which is permitted in applying the several components or members of the bearing over the said journal or shaft with a retained accuracy. The matching pins fitting in their sockets, and the keys or lugs of the roller locking rings together with the seats for said keys or lugs, also make it possible to associate the several parts of the bearing with certainty as to accurate operation and equal distribution of wear throughout the length of the rollers or of the bearing as a whole. The particular disposition of the several sectional components of the parts together with the mounting of the rollers 7 in the grooves or channels 6 in the bearing sleeve sections 5, also provide for readily separating the parts of the bearing or removing the roller locking rings and replacing one or more of the rollers 7 that may be found necessary, or, as heretofore indicated, to substitute for the rollers that have been used, different sizes of rollers to correct any deficiency of operation of the rollers that may be apparent.

It will be understood that in the formation of the bearing sleeve and the rollers, that the rollers may be solid or tubular, and that the best metal for the purpose will be adopted, and when it is desired to transport the bearing, it may be reduced to compact form by separating the several parts thereof, and closely arranging the same in such manner that the complete bearing may be subsequently set up in applied position with the certainty and accuracy heretofore specified.

It is further understood, as shown by letters Z—Z of the drawing, that a specially treated piece of felt is inserted between the back of bearing sleeve and inside of bearing collar, the use of which is, first, to deaden the noise, or used as a silencer, second, to provide a cushion to take up the blow or thrust of firing stroke, and third, to prevent rollers from remaining in the same position at all times, and prevent freezing of rollers; Figures 1, 2, 3, Z—Z of diagram.

It is also obvious that changes in the minor details of construction within the scope of the appended claim, may be adopted, and further, the general dimensions and proportions of the several parts of the bearing may be modified without departing from the nature or spirit of the invention.

What is claimed as new is:

In a bearing for engine connecting rods and crank shafts, a roller carrier composed of two semi-cylindrical members, each one of which is provided with two spaced series of longitudinally disposed roller carrier recesses open through the ends of the members, said series being arranged one upon each side of the dead center line of the bearing, means for holding the members together about a crank shaft, a plurality of cylindrical bearing rollers one to each recess and insertable through either end of its respective recess whereby a portion of the periphery projects beyond the inner face of the carrier, two locking rings fitting adjacent the ends of the carrier to close the ends of the recess, and cooperating means carried by the rings and the crank shaft for holding the rings against circumferential movement.

In testimony whereof I have hereunto set my hand.

LAURENCE LEONARD.